United States Patent
Pasupuleti et al.

(10) Patent No.: US 10,785,501 B2
(45) Date of Patent: Sep. 22, 2020

(54) SYSTEM AND METHOD OF PERFORMING MOTION ESTIMATION IN MULTIPLE REFERENCE FRAME

(71) Applicant: SQUID DESIGN SYSTEMS PVT LTD, Hyderabad (IN)

(72) Inventors: Venkata Suresh Babu Pasupuleti, Hyderabad (IN); Satyanarayana Uppalapati, Hyderabad (IN); Govinda Siva Prasad Vabbalareddy, Hyderabad (IN); Kishor Simma, Hyderabad (IN)

( * ) Notice: Subject to any disclaimer, the term of this patent is extended or adjusted under 35 U.S.C. 154(b) by 0 days.

(21) Appl. No.: 14/647,135

(22) PCT Filed: Nov. 25, 2013

(86) PCT No.: PCT/IB2013/060377
§ 371 (c)(1),
(2) Date: May 26, 2015

(87) PCT Pub. No.: WO2014/083492
PCT Pub. Date: Jun. 5, 2014

(65) Prior Publication Data
US 2015/0296218 A1    Oct. 15, 2015

(30) Foreign Application Priority Data
Nov. 27, 2012  (IN) .......................... 4926/CHE/2012

(51) Int. Cl.
*H04N 7/12*       (2006.01)
*H04N 19/58*      (2014.01)
*H04N 19/577*     (2014.01)

(52) U.S. Cl.
CPC .......... *H04N 19/58* (2014.11); *H04N 19/577* (2014.11)

(58) Field of Classification Search
CPC ............................. H04N 19/58; H04N 19/577
USPC ...................................... 375/240.15
See application file for complete search history.

(56) References Cited

U.S. PATENT DOCUMENTS

2006/0245497 A1* 11/2006 Tourapis ................ H04N 19/56
375/240.16

* cited by examiner

*Primary Examiner* — Sath V Perungavoor
*Assistant Examiner* — Peet Dhillon
(74) *Attorney, Agent, or Firm* — Steven A. Nielsen; www.NielsenPatents.com

(57) ABSTRACT

Methods for performing motion estimation in multiple reference frames scenario are disclosed. The method includes considering a motion vector of a plurality of neighbouring macro blocks present in a current frame and a co-located frame to find a best prediction point motion vector set, scaling at least one motion vector in a plurality of prediction frames and a plurality of bidirectional frames to find a predictive motion vector set by calculating a temporal distance between a nth reference frame and a reference frame referred by an input motion vector and finding at least one best prediction point motion vector of the nth reference frame from a set of motion vectors by utilizing a cost based motion search. The cost based motion search comprising finding a prediction motion vector, finding a cost factor, performing a cost based motion search of at least one partition level to find the best motion vector from the set of motion vectors.

9 Claims, 10 Drawing Sheets

SYSTEM AND METHOD OF PERFORMING MOTION ESTIMATION IN MULTIPLE REFERENCE FRAME

TECHNICAL FIELD OF THE INVENTION

The present invention generally relates to a video processing system. More particularly the present invention relates to a method and system method of performing motion estimation algorithm of multiple reference frames by utilizing an integer-pixel motion estimation and fractional-pixel motion estimation.

BACKGROUND OF THE INVENTION

Generally, to transmit video data over band-limited communication channels and to store on compact storage devices an efficient data compression technique is required to represent the video data. The video data transfer is in the form of bit streams comprising a series of two dimensional images consisting of a number of horizontally and vertically placed pixels.

Typically, to remove the temporal redundancy between the consecutive images of video data an efficient motion estimation algorithm is required to encode any video data. There are different types of encoding standards among them one of the methods conventionally used for the compression of video data into macro blocks is inter/intra block coding. Each individual macro block is either coded as intra/inter, wherein intra block coding is used for exploiting spatial correlation and inter block coding for exploiting temporal correlation. Inter block coding is mostly used for predicting the macro blocks of current frame from the previous reference frames whereas the intra block coding is used for macro blocks with high spatial correlation.

Conventionally, the method used for encoding the video data is performed by considering the motion estimation at block levels. The image is divided into macro blocks and each macro block is searched across the previous reference frames to find out the best match and sends the motion vector of best match to the decoder. Therefore to select the best motion vector, a rate-distortion cost is used to find out the best motion vector in the set of motion vectors available in the search window. But the above video coding standard techniques used to represent the best match information the number of divisions of macro blocks are limited up to the size of the macro block.

Typically, to overcome the above mentioned video coding technique for a limited block size of a motion estimation search, other methods have been used for finding the best match information. These methods are capable of finding the best match at different block sizes and are also able to use the n-stage motion estimation search patterns to find the best motion vector. Thus the process of finding this n-stage motion estimation search is possible by calculating the cost factor of individual partition and the entire macro block. But the conventional n-stage search method used for finding the best search point is able to represent only a single motion vector in a single stretch.

Furthermore, multiple reference frames are used to find the best match of a block. The original data block coming out from the current frame and the predicted data block taken from the reference frame are used to calculate the rate distortion cost. Initially best reference frame is searched that matches the data block present in the current frame and finds the best partition mode of each sub block to find the best match of a block. But finding of rate distortion costs and performing motion estimation over the multiple reference frames involves more complexity when compared to that of single reference frame case.

In the light of aforementioned limitations, there exists a need of finding a best prediction point motion vector for motion estimation algorithm by considering the motion vectors of neighbouring macro blocks of both current frame and co-located frame.

BRIEF SUMMARY OF THE INVENTION

The following presents a simplified summary of the disclosure in order to provide a basic [idea/view]-does not identify key/critical elements of the invention or delineate the scope of the invention. Its sole purpose is to present some concepts disclosed herein in a simplified form as a prelude to the more detailed description that is presented later.

Exemplary embodiments of the present invention are directed towards a method of performing motion estimation over multiple reference frames.

According to a first aspect, a method of performing motion estimation over multiple reference frames in a video processing system is disclosed. The method includes considering at least one motion vector of a plurality of neighbouring macro blocks present in a current frame and a co-located frame to find a best prediction point motion vector set. A current macro block of the current frame and an at least one neighbouring macro block of the current frame are co-related with a co-located macro block of the co-located frame and at least one neighbouring macro block of the co-located frame.

According to the first aspect, the method includes scaling at least one motion vector in a plurality of prediction frames and a plurality of bidirectional frames to find a predictive motion vector set by calculating a temporal distance between a nth reference frame and a reference frame referred by an input motion vector.

According to the first aspect, the method includes finding at least one best motion vector of the nth reference frame from a set of plurality of motion vectors by utilizing a cost based motion search including finding a prediction motion vector from at least one maximum partition level by utilizing a motion vector prediction procedure according to the video coding standards, finding a cost factor of the at least one motion vector from a set of plurality of motion vectors to determine the best motion vector as a centre of motion vector, performing a cost based motion search of at least one partition level to find the best motion vector from the set of plurality of motion vectors and assigning a best motion vector obtained for the $n^{th}$ reference frame to a centre of motion vector of $n^{th}$ reference frame.

According to a second aspect, a method of performing an integer pixel based motion estimation over multiple reference frames in a video processing system is disclosed. According to the second aspect, the method includes calculating a best motion vector in a search window around a centre motion vector for at least one reference frame by utilizing the integer pixel motion estimation search pattern including performing a coarse-grain motion estimation search in a first (M−1) steps at a maximum partition level among a plurality of partition levels for calculating a cost factor with a sum of absolute difference value to find a motion vector as a centre point for fine-grain motion estimation performing a fine-grain motion estimation search at a plurality of partition levels in a third step by calculating a sum of absolute difference value to find the best partition mode, and finding the best partition mode for the nth reference frame by calculating a minimum rate distortion cost at the maximum partition level among the plurality of partition levels and a minimum rate distortion cost at the remaining partition levels among the plurality of partition levels.

According to a third aspect, a method of performing a fractional pixel based motion estimation algorithm over multiple reference frames in a video processing system is disclosed. According to third aspect, the method includes calculating a cost based motion estimation at a best partition level to find a best search point from an eight half pixel points and one integer pixel point. The best search point result obtained from the eight half pixel points and one integer pixel point is assigned to a centre motion vector.

According to the third aspect, the method includes calculating a cost based motion estimation at a best partition level to find the best search point from an eight quarter pixel points and one resulted in half pixel motion estimation process, whereby the best search point result obtained from the eight quarter pixel points and one resulted in half pixel motion estimation process includes a motion vector and a rate-distortion cost value of the nth reference frame.

According to the third aspect, the method includes performing a cost based half-pixel motion estimation and a quarter-pixel motion estimation in a plurality of frames to find the reference index of at least one partition in a macro block by considering a rate distortion cost, a reference index weight factor and a partition mode weight factors.

According to the third aspect, the method includes finding a rate distortion cost of a plurality of prediction frame skip points and a plurality of bidirectional frame skip points by compensating a motion of plurality of motion vectors. A plurality of prediction frame skip motion vectors and a plurality of bidirectional frame skip motion vectors are compared with motion vectors resulted in fractional pixel motion estimation processes to provide a final motion vector in case of single directional mode and final motion vectors in case of bidirectional mode.

BRIEF DESCRIPTION OF THE DRAWINGS

The above-mentioned and other features and advantages of this present disclosure, and the manner of attaining them, will become more apparent and the present disclosure will be better understood by reference to the following description of embodiments of the present disclosure taken in conjunction with the accompanying drawings, wherein.

DETAIL DESCRIPTION OF THE INVENTION

Figure 1:
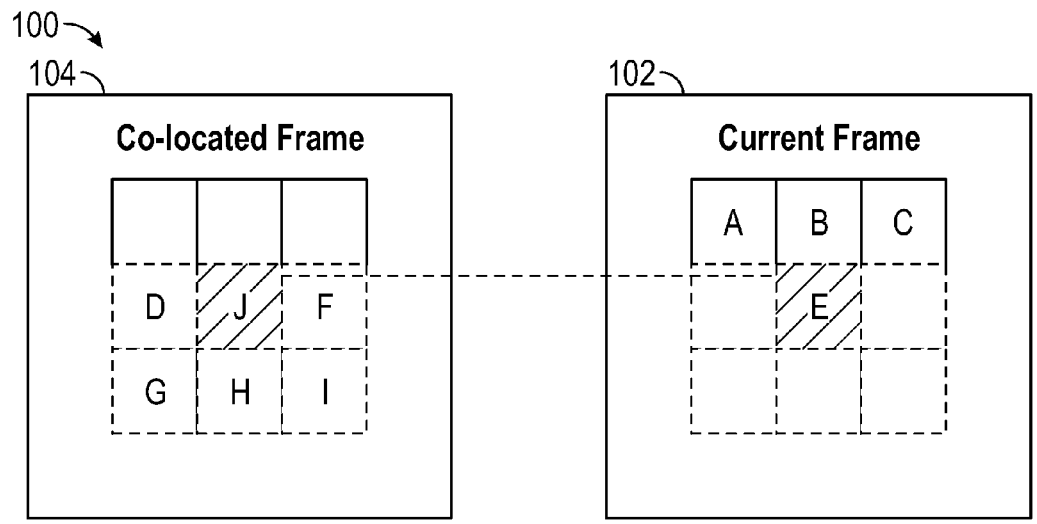
FIG. 1 is a diagram depicting a correlation between a current frame and a co-located frame.

It is to be understood that the present disclosure is not limited in its application to the details of construction and the arrangement of components set forth in the following description or illustrated in the drawings. The present disclosure is capable of other embodiments and of being practiced or of being carried out in various ways. Also, it is to be understood that the phraseology and terminology used herein is for the purpose of description and should not be regarded as limiting.

The use of "including", "comprising" or "having" and variations thereof herein is meant to encompass the items listed thereafter and equivalents thereof as well as additional items. The terms "a" and "an" herein do not denote a limitation of quantity, but rather denote the presence of at least one of the referenced item. Further, the use of terms "first", "second", and "third", and the like, herein do not denote any order, quantity, or importance, but rather are used to distinguish one element from another.

Referring to FIG. 1 is a diagram 100 depicting a correlation between a current frame and a co-located frame. According to a non limiting exemplary embodiment of the present invention, the multiple reference frame motion estimation process includes a current frame 102 and a co-located frame 104 to correlate a current macro block of the current frame 102 with a co-located macro block of the co-located frame 104 and a neighbouring macro block of the current macro block with a neighbouring macro block of the co-located macro block.

In accordance with a non limiting exemplary embodiment of the present invention, the motion estimation is a predictive based motion estimation algorithm having an exhaustive motion search which may include but not limited to a full search, diamond search, 3-step search and the like identified by finding a best prediction point motion vector from a set of predictive motion vectors. The predictive motion vector set is formed by considering the multiple motion vectors of multiple neighbouring blocks present in the current frame 102 and the co-located frame 104. The predictive motion vector set Sn={mv0, mv1, mv2, ...,} for $n^{th}$ reference frame are calculated in multiple steps. At first step (0,0) motion vector is assigned to mv0 which is referred as a motion vector zero and at second step motion vector one assumed as mv1 is expressed by considering the availability of macro block B in the current frame 102, if the macro block B of the current frame 102 is found to be available, the motion vector of bottom-left corner block in macro block B is assigned to the mv1 and a reference frame index of bottom-left corner block in macro block B is assigned to a variable i1 and if the macro block B of the current frame 102 is found to be not available, then the motion vector of top-left corner block in macro block H of the co-located frame 104 is assigned to the motion vector mv1 and the reference frame index of top-left corner block in macro block H is assigned to a variable i1. The motion vector one mv1 is assigned with a conditional operator as if n is not equal to variable i1, then the result is mv1 and if n is equal to variable i1, then the result is equal to the scaled version of motion vector one mv1 and also further the motion vector one mv1 is right shifted by a factor two with rounding the factor value equal to two.

According to a non limiting exemplary embodiment of the present invention, at third step motion vector two assumed as mv2 is expressed by considering the availability of macro block C in the current frame 102, if the macro block C of the current frame 102 is found to be available the motion vector of bottom-left corner block in macro block C is assigned to the mv2 and the reference frame index of bottom-left corner block in macro block C is assigned to a variable i2 and if the macro block C of the current frame 102 is found to be not available then the motion vector of top-left corner block in macro block I of the co-located frame 104 is assigned to the motion vector mv2 and the reference frame index of top-left corner block in macro block I is assigned to a variable i2. The motion vector two mv2 is assigned with a conditional operator as if n is not equal to variable i2, then the result is mv2 and if n is equal to variable i2, then the result is equal to the scaled version of motion vector mv2 and also further the motion vector two mv2 is right shifted by a factor two with rounding the factor value equal to two.

In accordance with a non limiting exemplary embodiment of the present invention, at step four the motion vector three assumed as mv3 is expressed by considering the availability of macro block A in the current frame 102, if the macro block A of the current frame 102 is found to be available then the motion vector of bottom-right corner block in macro block A is assigned to the mv3 and the reference frame index of bottom-right corner block in macro block A is assigned to a variable i3 and if the macro block A of the current frame 102 is found to be not available then the motion vector of top-right corner block in macro block G of the co-located frame 104 is assigned to the motion vector mv3 and the reference frame index of top-right corner block in macro block G is assigned to a variable i3. The motion vector three mv3 is assigned with a conditional operator as if n is not equal to variable i3, then the result is motion vector three mv3 and if n is equal to variable i3, then the result is equal to the scaled version of motion vector three mv3 and also further the motion vector three mv3 is right shifted by a factor two with rounding the factor equal to two.

According to a non limiting exemplary embodiment of the present invention, at step five the motion vector four assumed as mv4 is expressed by assigning the motion vector of top-left corner block in macro block J of the co-located frame 104 to the motion vector four mv4 and the reference frame index of top-left corner block in macro block J is assigned to the variable i4. The motion vector four mv4 is assigned with a conditional operator as if n is not equal to variable i4, then the result is motion vector four mv4 and if n is equal to variable i4, then the result is equal to the scaled version of motion vector mv4 and also further the motion vector four mv4 is right shifted by a factor two with rounding the factor value equal to two. At step six the motion vector five assumed as mv5 is expressed by considering the availability of macro block D in the co-located frame 104, if the macro block D of the co-located frame 104 is found to be available then the motion vector of top-right corner block in the macro block D is assigned to the motion vector five mv5 and the reference frame index of top-right corner block in the macro block D is assigned to a variable i5 and if the macro block D of the co-located frame 104 is found to be not available then the motion vector of top-left corner block in the macro block F of the co-located frame 104 is assigned to the motion vector mv5 and the reference frame index of top-left corner block in the macro block F is assigned to a variable i5. The motion vector five mv5 is assigned with a conditional operator as if n is not equal to variable i5, then the result is motion vector five mv5 and if n is equal to variable i5, then the result is equal to the scaled version of motion vector five mv5 and also further the motion vector five mv5 is right shifted by a factor two with the rounding the factor value equal to two.

In accordance with a non limiting exemplary embodiment of the present invention, the scaling function used to scale the motion vector in the above steps for calculating the motion vector is performed by providing a temporal distance between a $n^{th}$ reference frame and a reference frame referred by an input motion vector which are presented separately for both a predicted frame and a bidirectional predicted frame. Thus to find a best motion vector from a set of multiple motion vectors a cost based motion search is being utilized. The best motion vector for $n^{th}$ reference frame is found by finding a real prediction motion vector from a maximum partition level among a multiple partition levels by utilizing a motion vector of prediction procedure according to the video coding standards, where the maximum partition level is being referred as a 16×16 partition level.

According to a non limiting exemplary embodiment of the present invention, the cost factor is being calculated for each motion vector from a set of multiple motion vectors by multiplying the lamda value with the subtraction of motion vector bits and predicted motion vector bits and a cost based motion search at a maximum partition level is performed to find the best motion vector from the set of multiple motion vectors and further the best prediction point motion vector obtained for the $n^{th}$ reference frame is being assigned to a centre motion vector of $n^{th}$ reference frame denoted by cmvn.

Figure 2:
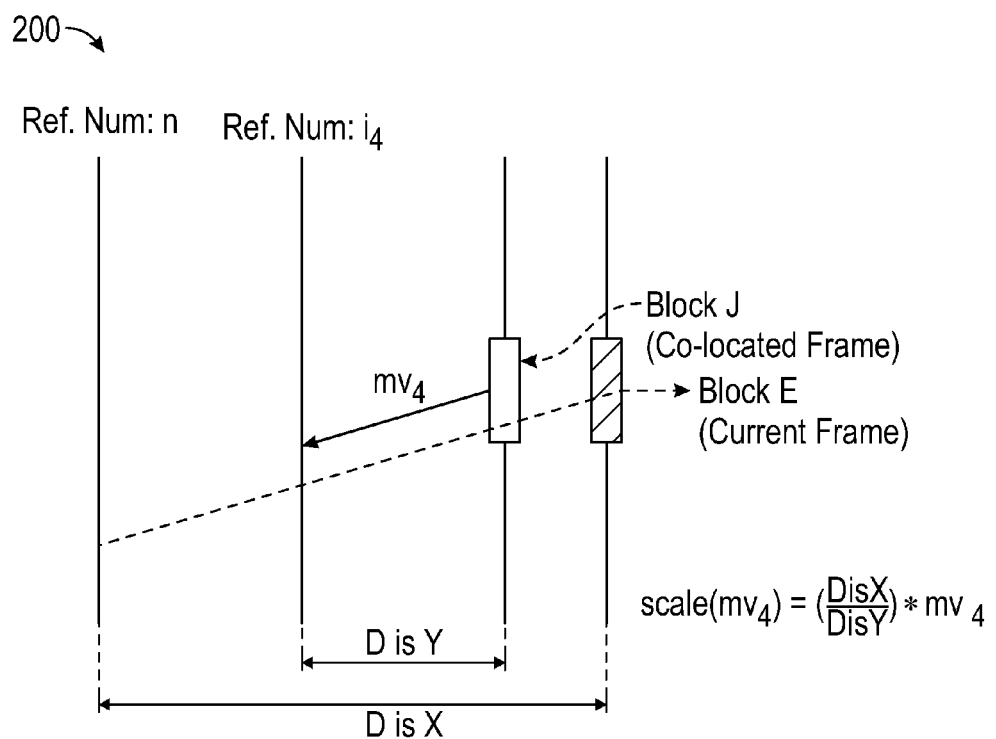
FIG. 2 is a diagram depicting a process of scaling a motion vector in case of single directional motion estimation process.

Referring to FIG. 2 is a diagram 200 depicting a process of scaling a motion vector in a single directional motion estimation process. According to a non limiting exemplary embodiment of the present invention, a motion vector is scaled by using a scaling function in a prediction frame by calculating a temporal distance between a current frame of a current macro block E and $n^{th}$ reference frame whose distance is being denoted as distance X(DisX) and also by calculating the temporal distance between a co-located frame and a reference frame referred by the co-located macro block J whose distance is being denoted as distance Y(DisY). For example the scaling function for motion vector four is found by multiplying the motion vector four mv4 with the result obtained from dividing the both the distances DisX and DisY. Similarly the scaling function for multiple motion vectors can be determined.

Figure 3:
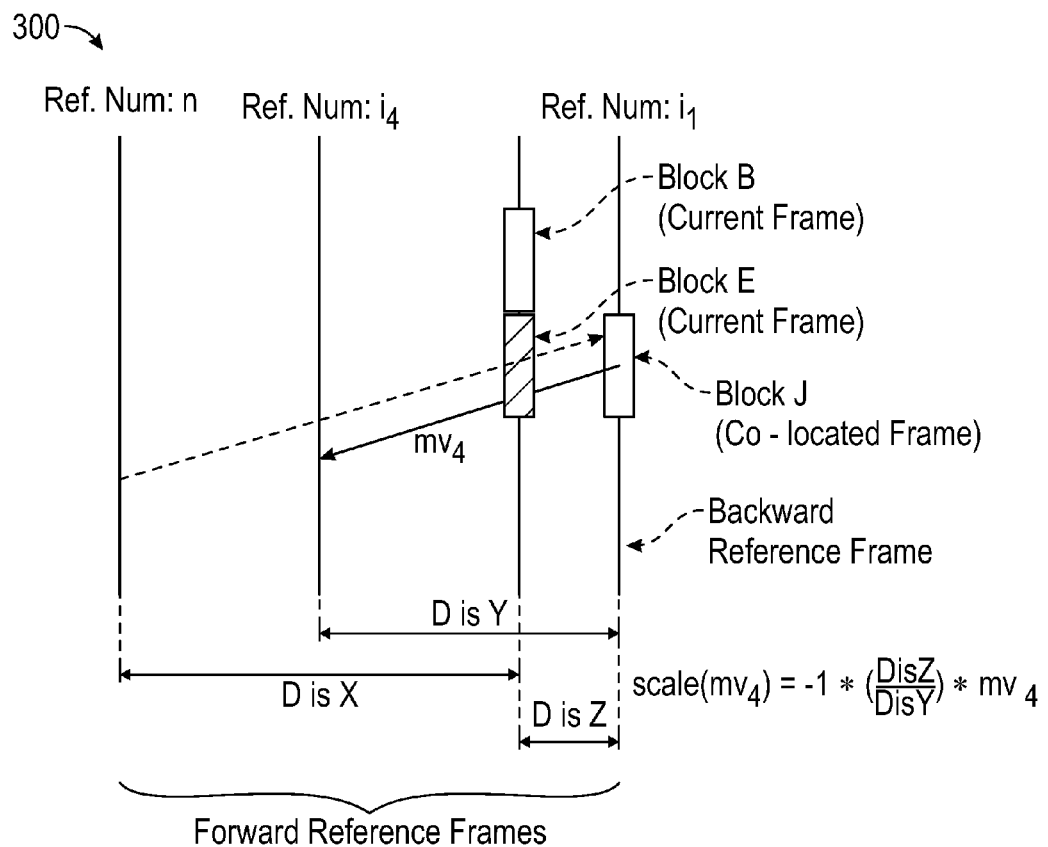
FIG. 3 is a diagram depicting a process of scaling motion vectors in case of bidirectional motion estimation process.

Referring to FIG. 3 is a diagram 300 depicting a process of scaling motion vectors in a bidirectional motion estimation process. According to a non limiting exemplary embodiment of the present invention, in case of scaling a motion vector in a bidirectional fame, The motion estimation process is carried out over n−1 forward reference frames and over one backward reference frame. The process used for scaling a motion vector calculates the temporal distance between a current frame of macro block B and macro block E and the reference frame referred by ref: n whose distance is denoted as the distance X(DisX).

In accordance with a non limiting exemplary embodiment of the present invention, the temporal distance calculated between a current frame having the macro block B and macro block E and the backward reference frame having the co-located macro block J are denoted with the distance Z(DisZ) and the temporal distance calculated between the co-located frame and reference frame referred by the co-located macro block J is denoted by the distance distance Y(DisY). For example the scaling operations are provided for fourth motion vector mv4 by forming the forward reference frame and the backward reference frame. Therefore the scaling function used for calculating fourth motion vector mv4 for a forward reference frame by multiplying the fourth motion vector with the result obtained by dividing the DisX and DisY and the scaling function of fourth motion vector for a backward reference frame is calculated by multiplying the motion vector with an integer minus one (−1) and the result obtained by dividing the DisZ and DisY.

Figure 4:
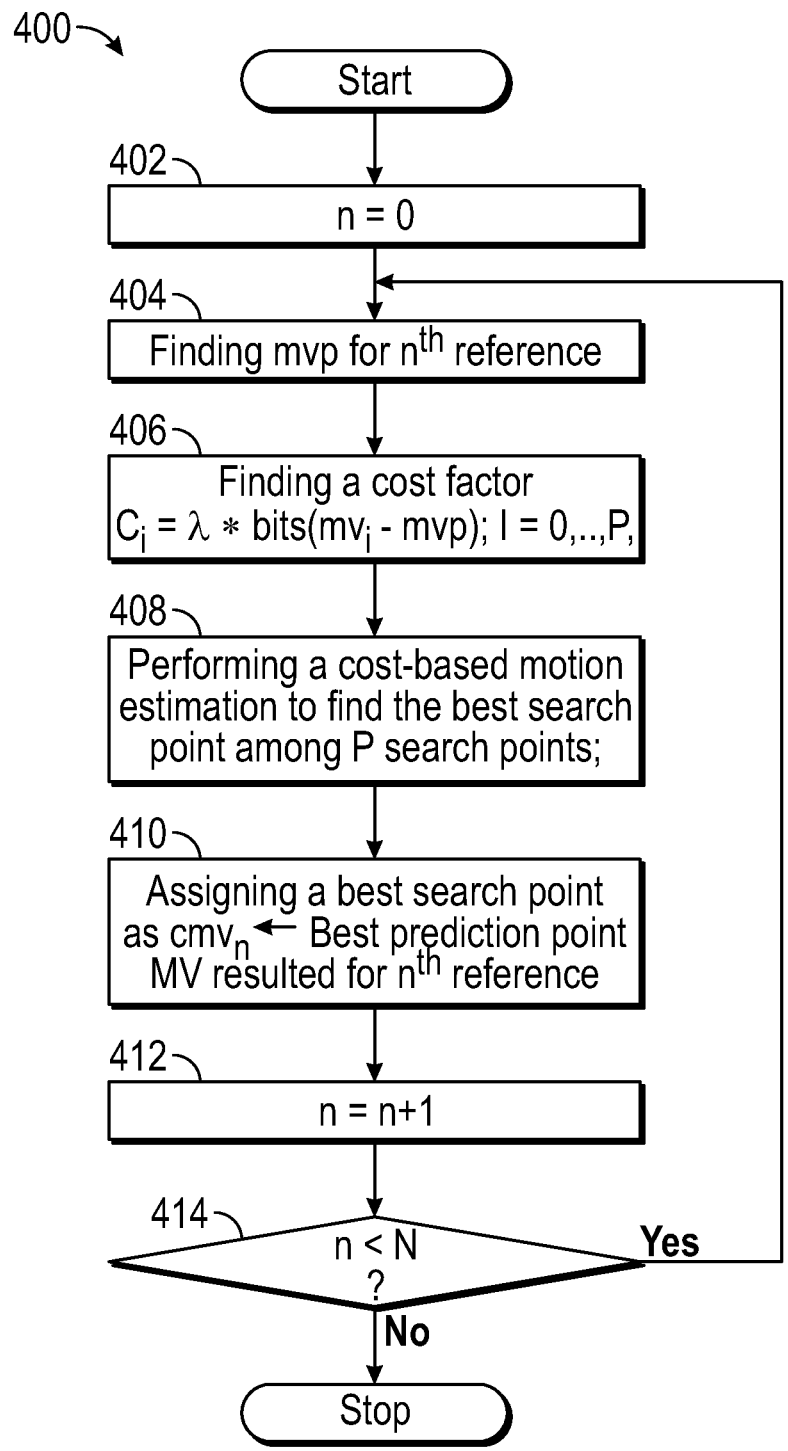
FIG. 4 is a flow diagram depicting a method employed for finding a best prediction point motion vector in each reference frame.

Referring to FIG. 4 is a flow diagram 400 depicting a method employed for finding a best prediction point motion vector in each reference frame. According to a non limiting exemplary embodiment of the present invention, the method of finding a best prediction point motion vector starts at step 402 by assigning the number of reference frame value to zero as n=0. At step 404 the motion vector prediction point of the assigned $n^{th}$ reference frame is found by calculating the cost factor value at step 406 by multiplying the lamda value with the subtraction of motion vector bits and predicted motion vector bits. The cost value corresponding to each predicted motion vector is denoted by Ci, i=0, 1, . . . P, where P denotes the number of motion vectors available on set Sn.

According to a non limiting exemplary embodiment of the present invention, at step 408 a cost based motion estimation search is performed to find a best search point among a et of multiple motion vectors search points and next at step 410 the best search point result obtained as a best prediction point motion vector of $n^{th}$ reference frame is assigned to a centre motion vector cmvn. Further at step 412 the reference frame number is being increased by one as n+1 and a condition is checked at step 414 that whether the increased value of reference frame number is less than the number of reference frames or not. If the reference frame number is found to be less than the number of reference frames then the method continues with step 404 and if the reference frame number is found to be greater than or equal to the number of reference frames, the method stops at step 414.

Figure 5:
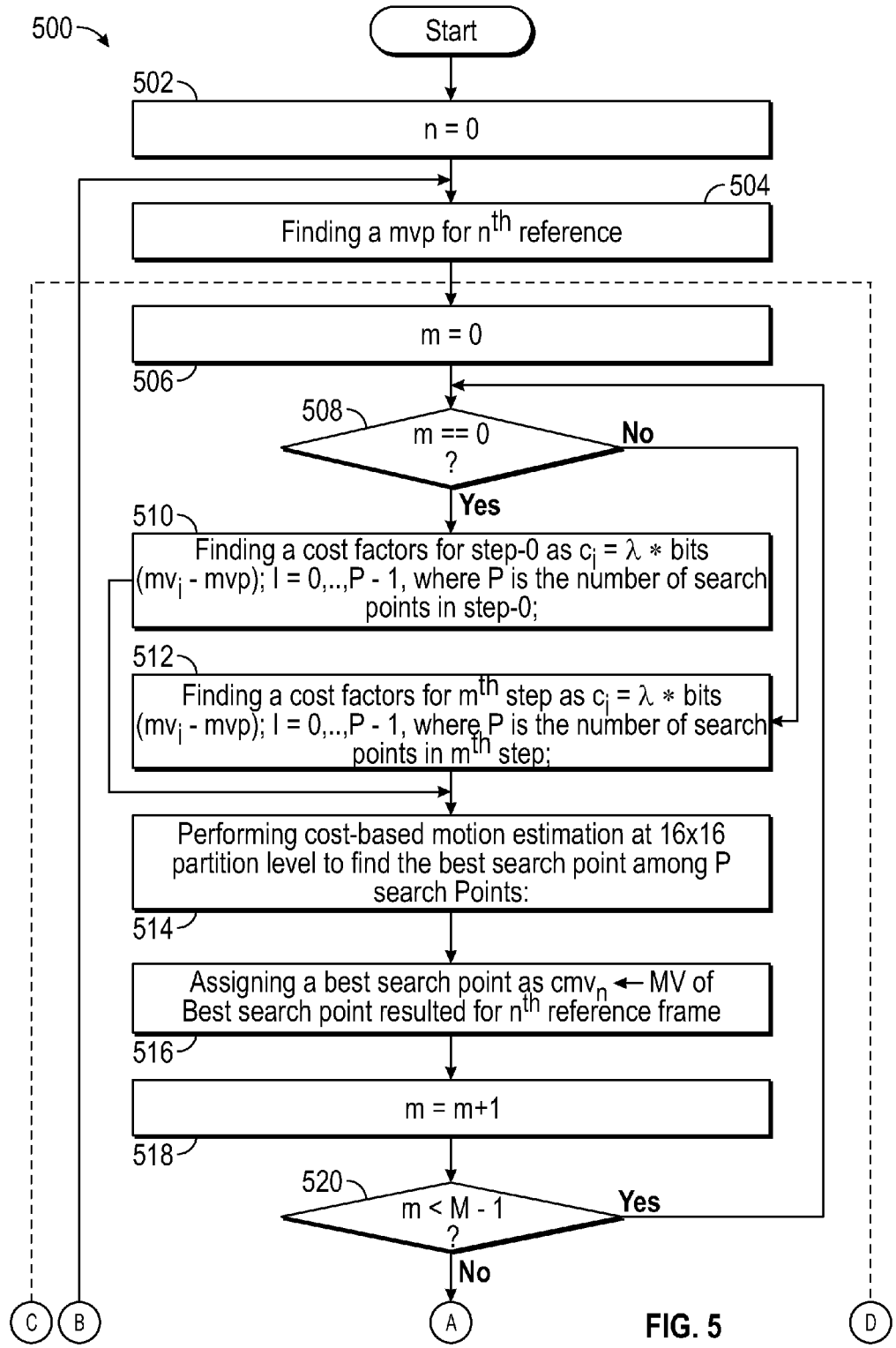
FIG. 5 is a flow diagram depicting a method employed for finding a best partition mode for $n^{th}$ reference frame by utilizing an integer-pixel motion estimation.
Figure 5:
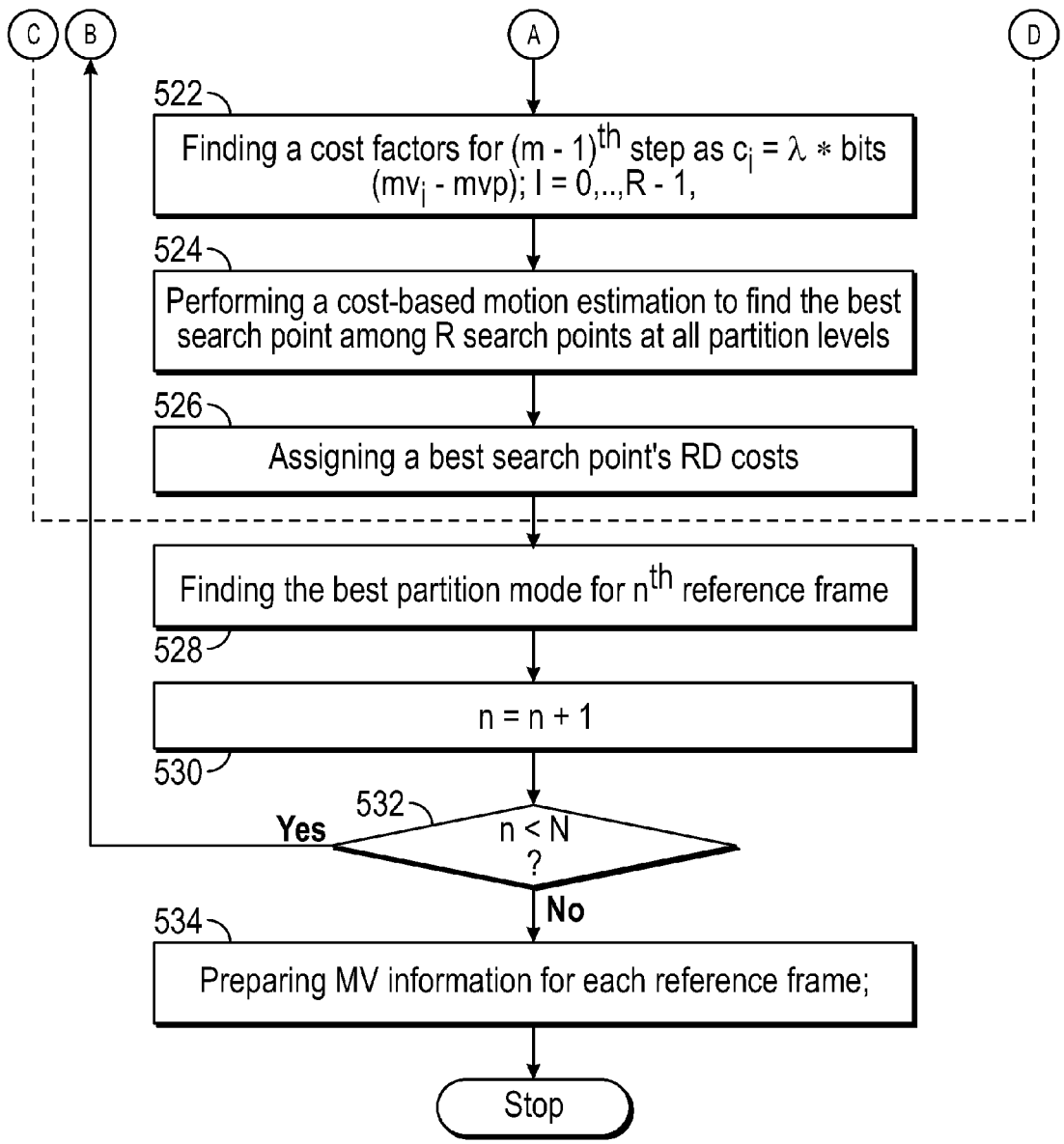

Referring to FIG. 5 is a flow diagram 500 depicting a method employed for finding a best partition mode and the corresponding best integer pixel motion vectors of partitions for $n^{th}$ reference frame by utilizing an integer-pixel motion estimation. According to a non limiting exemplary embodiment of the present invention, the method of finding a best partition mode for $n^{th}$ reference frame starts at step 502 by assigning the number of reference frame value to zero as n=0. At step 504 the predicted motion vector of the assigned $n^{th}$ reference frame is calculated by using three steps of integer pixel motion estimation algorithm. In three steps of integer pixel motion estimation, the first two steps are as coarse-grain motion estimation steps and the last step of three steps is as a fine-grain motion estimation step for finding a best partition mode.

In accordance with a non limiting exemplary embodiment of the present invention, the step 506 starts the coarse-grain motion estimation search by considering the value of an 'm' to zero where the 'm' value is referred as the number of steps used in integer pixel motion estimation. Next at step 508 a condition is provided that whether the m value is equal to zero or not, if the m value is found to be zero the cost factors of multiple search points in step zero are found at step 510. The cost factor at step 510 is calculated by multiplying the lamda value with the subtraction of motion vector bits(mvi) and predicted motion vector bits(mvp) for multiple P search points in Step-0 where i value ranges from 0,1, . . . P−1 and continues with the step 514. If the m value is found to be not equal to zero at step 508 the cost factors of multiple search points in $m^{th}$ step are found at step 512. The cost factor at step 512 is calculated by multiplying the lamda value with the subtraction of motion vector bits(mvi) and predicted motion vector bits(mvp) for multiple P search points in $m^{th}$ step where the i value ranges from 0,1, . . . P−1 and continues with the step 514.

According to a non limiting exemplary embodiment of the present invention, at step 514 the cost based motion estimation is performed at a maximum partition level to find a best search point among the number of P search points. Next at step 516 the motion vector of best search point obtained from the $n^{th}$ reference frame is assigned to a centre of the $n^{th}$ motion vector cmvn. Further at step 518, the m value is increased by one and verifies a condition at step 520 that whether the step value (m value) is found to be less than the M−1 step value, if the m value is found to be less than the M−1 step value, the method continues with the step 508 and if the m value is found to be not less than the M−1 step value the method continues with fine-grain motion estimation step which starts at step 522.

In accordance with a non limiting exemplary embodiment of the present invention, at step 522 the cost factors for R search points in $(M-1)^{th}$ step are found. The cost factor at step 522 is calculated by multiplying the lamda value with the subtraction of motion vector bits(mvi) and predicted motion vector bits(mvp) where the value of i ranges from 0,1, . . . R−1. Next at step 524 the cost based motion estimation is performed to find the best search point among the R search points at of multiple partition levels which may include but not limited to a 16×16, 16×8, 8×16, 8×8 and the like. Further at step 526 the best search points of multiple partition levels which may include but not limited to a 16×16, 16×8, 8×16, 8×8 and the like minimum rate distortion cost resulted for the $n^{th}$ reference frame are assigned to the each partitions rate distortion cost factor as R16×16 (0,n), . . . R8×8 (3,n).

According to a non limiting exemplary embodiment of the present invention, at step 528 the best partition mode for $n^{th}$ reference frame is found from the rate distortion cost of multiple partition levels which may include but not limited to 16×16, 16×8, 8×16, 8×8 by finding the minimum rate distortion cost among R16×16, R16×8, R8×16, R8×8 and assigned to Rn. The assigned Rn value is used to find the partition number corresponding to $n^{th}$ reference frame and assigned to a $n^{th}$ best part (Best partn). Next at step 530 the n value which refers to the reference frame number is increased by one and a condition is checked at step 532 that whether the increased value of reference frame number is less than the number of reference frames or not. If the reference frame number is found to be less than the number of reference frames then the method continues with step 504 and if the reference frame number is found to be equal or greater than the number of reference frames the method continues with the step 534 where the motion vector information which may include but not limited to a partition mode, motion vectors of multiple partitions and sum of absolute difference values and the like of each reference frame is being prepared.

Figure 6:
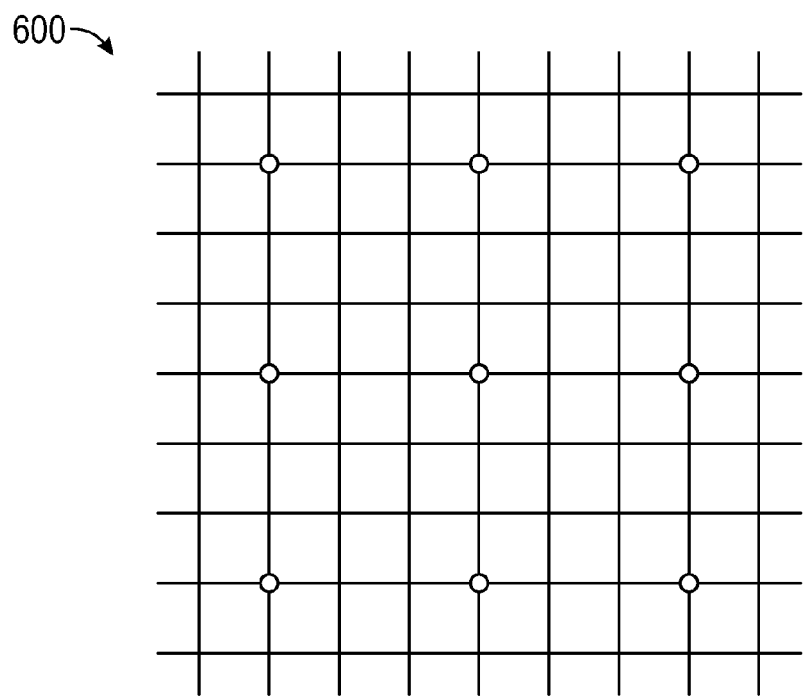
FIG. 6 is a diagram depicting a search pattern for $0^{th}$ step of integer-pixel motion estimation.

Referring to FIG. 6 is a diagram 600 depicting an example search pattern for $0^{th}$ step of integer-pixel motion estimation. According to a non limiting exemplary embodiment of the present invention, the integer pixel motion estimation performs an exhaustive motion search for $n^{th}$ reference frame by carrying out M steps on each reference frame's search area. The search pattern for $0^{th}$ step of integer pixel motion estimation is a part of coarse-grain motion estimation where a prediction motion vector is calculated and a cost factor for step zero is found from the set of multiple motion vectors for step zero using the n number of centre motion vectors. The cost factor for step-0 is calculated by multiplying the lamda value with the subtraction of motion vector bits(mvi) and predicted motion vector bits(mvp) where the value of i ranges from 0,1, . . . P−1.

Figure 7:
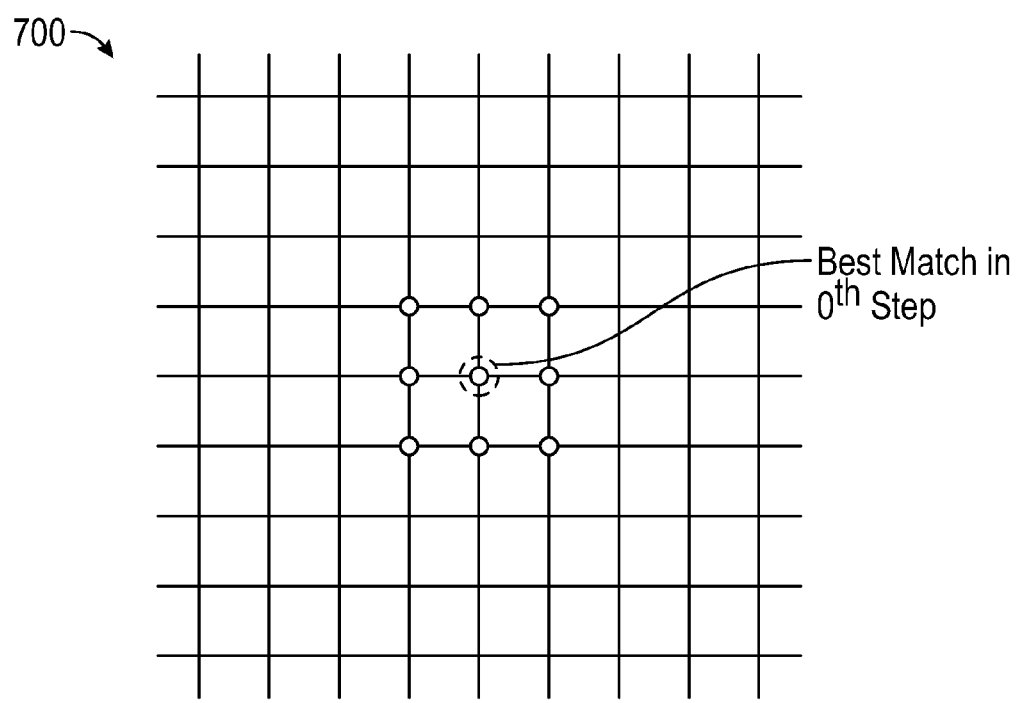
FIG. 7 is a diagram depicting a search pattern for $1^{st}$ step of integer-pixel motion estimation.

Referring to FIG. 7 is a diagram 700 depicting an example search pattern for $1^{st}$ step of integer-pixel motion estimation. According to a non limiting exemplary embodiment of the present invention, the integer pixel motion estimation performs an exhaustive motion search for $n^{th}$ reference frame by carrying out M steps on each reference frame's search area. The search pattern for $1^{st}$ to $(M-2)^{th}$ steps of integer pixel motion estimation are also a part of coarse-grain motion estimation. The cost factor for step-1, step-2, . . . , step (M−2) are calculated by multiplying the lamda value with the subtraction of motion vector bits(mvi) and predicted motion vector bits(mvp) were the value of i ranges from 0,1, . . . P−1. Thus best matches of $1^{st}$ to (M−2) nd steps can be calculated by performing a cost based motion estimation at maximum at 16×16 partition level.

Figure 8:
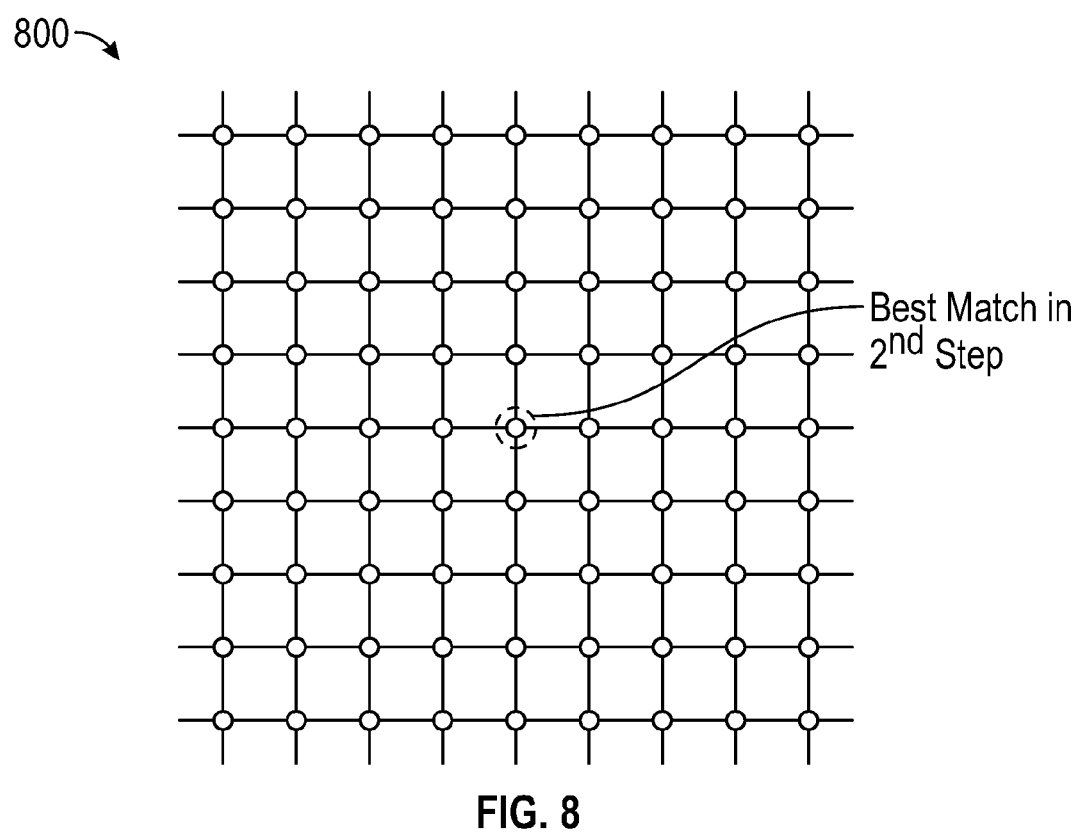
FIG. 8 is a diagram depicting a search pattern for $2^{nd}$ step of integer-pixel motion estimation.

Referring to FIG. 8 is a diagram 800 depicting an example search pattern for $(M-1)^{th}$ step of integer-pixel motion estimation. According to a non limiting exemplary embodiment of the present invention, the integer pixel motion estimation performs an exhaustive motion search for $n^{th}$ reference frame by carrying out M steps on each reference frame's search area. The search pattern for $(M-1)^{st}$ step of integer pixel motion estimation is performed by using a fine-grain motion estimation. The cost factors at $(M-1)^{th}$ step are calculated by multiplying the lamda value with the subtraction of motion vector bits(mvi) and predicted motion vector bits(mvp) where the value of i ranges from 0,1, . . . R−1. Thus the best search point in $(M-1)^{th}$ step is found by performing a cost based motion estimation at multiple partition levels which may include but not limited to a 16×16, 16×8, 8×16, 8×8 and the like.

Figure 9:
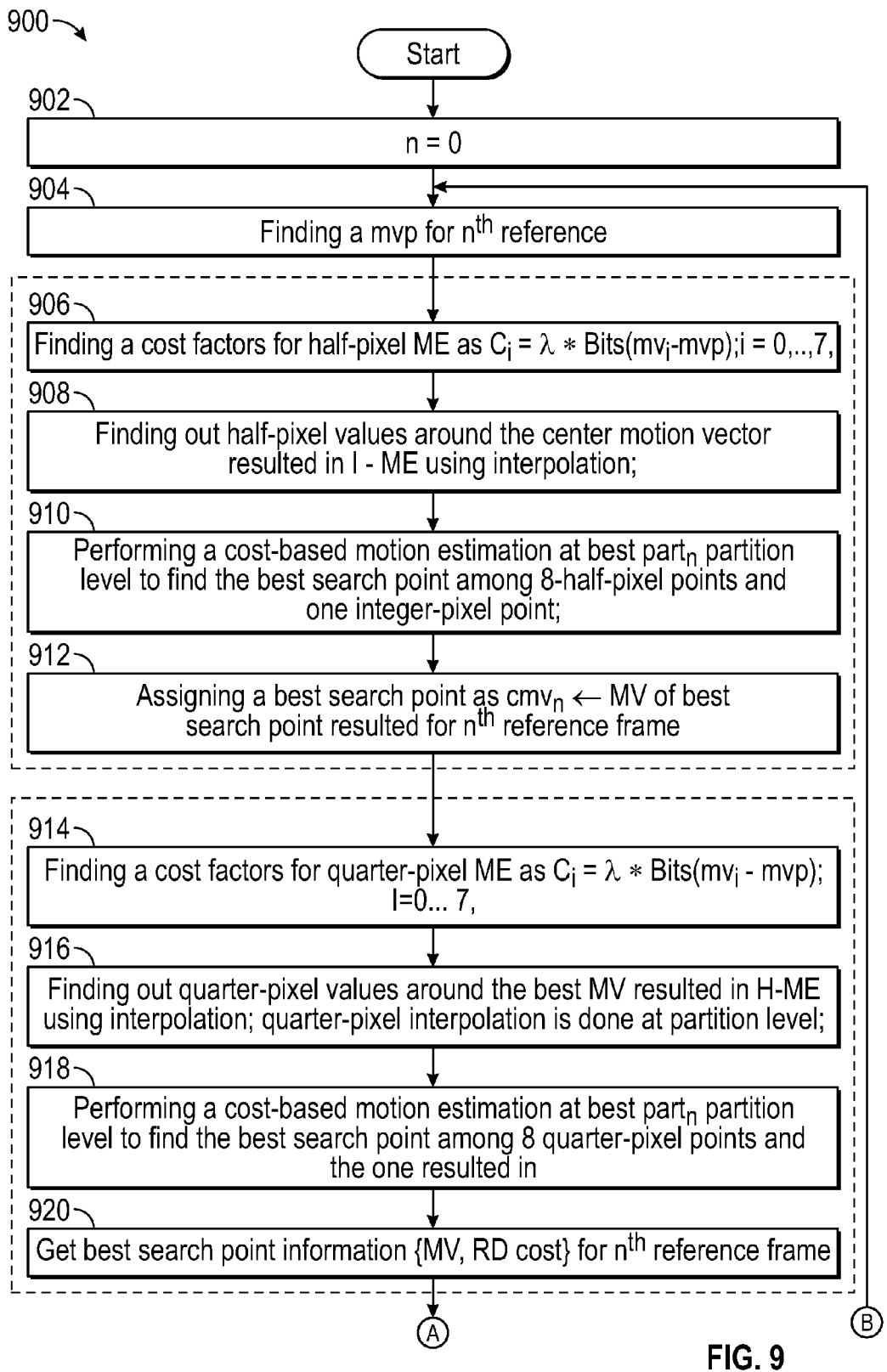
FIG. 9 is a flow diagram depicting a method employed for finding a best reference frame by utilizing a fractional-pixel motion estimation task.
Figure 9:
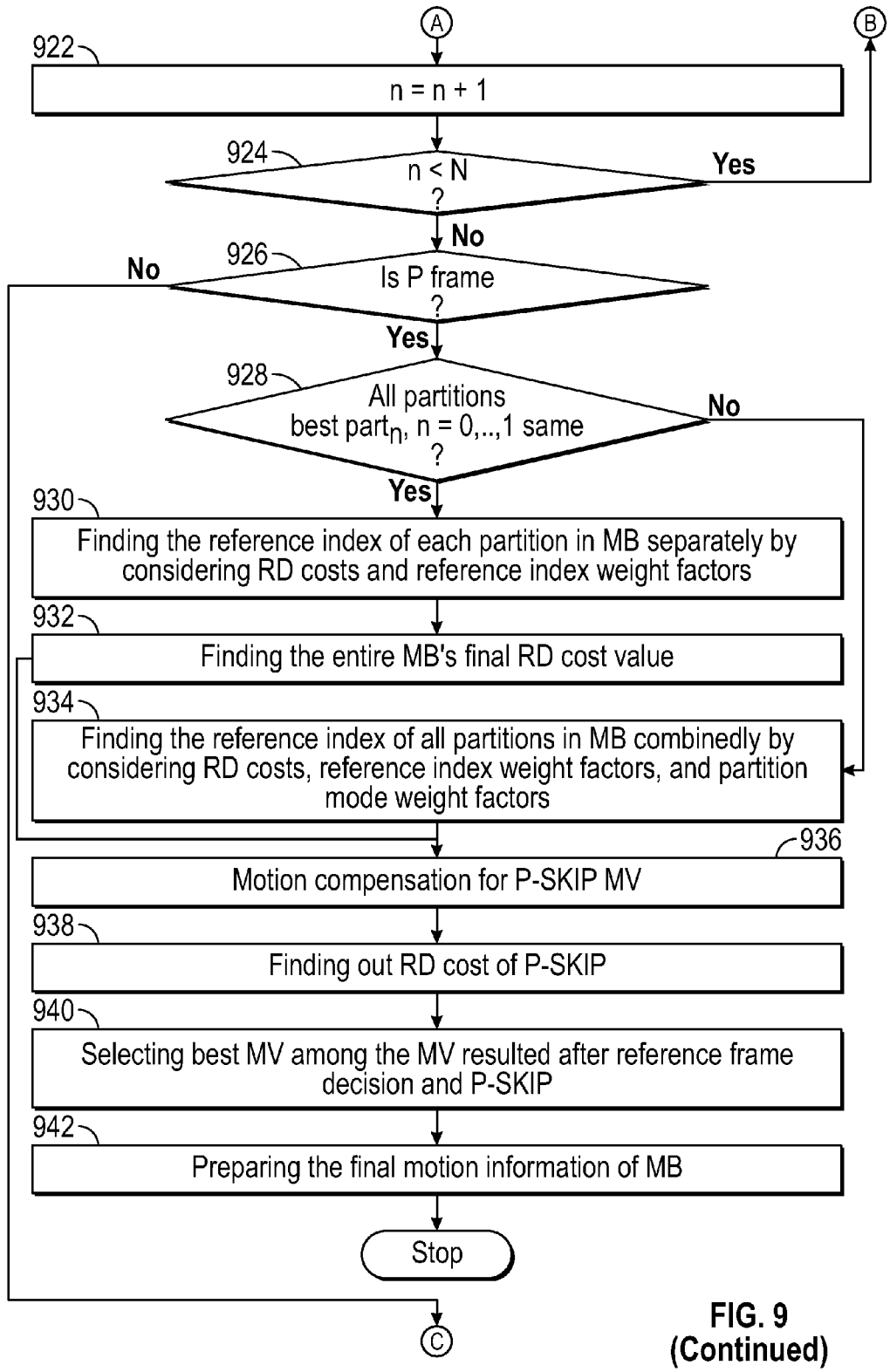
Figure 9:
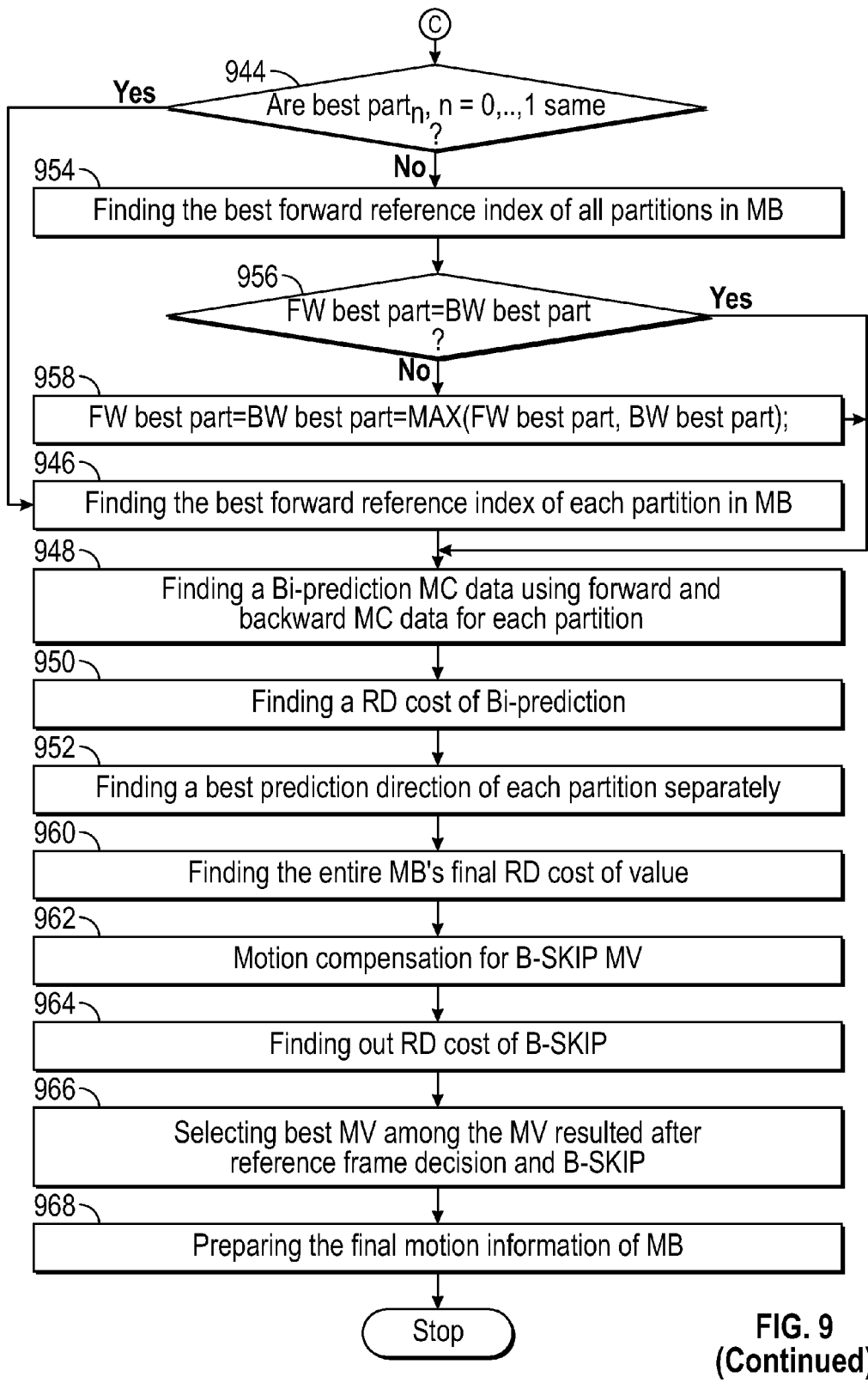

Referring to FIG. 9 is a flow diagram 900 depicting a method employed for finding a best reference frame by utilizing a fractional-pixel motion estimation task. According to a non limiting exemplary embodiment of the present invention, the method of finding a best reference frame starts at step 902 by assigning the number of reference frame value to zero as n=0. At step 904 the predicted motion vector of the assigned $n^{th}$ reference frame is calculated by using the motion vectors of spatial surrounding macro blocks.

In accordance with a non limiting exemplary embodiment of the present invention, the step 906 starts the eight half pixel motion estimation stage by calculating the cost factors for half-pixel motion estimation which are being found from the set of multiple motion vectors by using the best integer-pixel motion estimation motion vector. The cost factor at step 906 is calculated by multiplying the lamda value with the subtraction of motion vector bits(mvi) and predicted motion vector bits(mvp), where i value ranges from 0 to 7. Next at step 908 the half pixel values around the centre motion vector are found by the results obtained from the integer-pixel motion estimation using interpolation which is being processed at partition level. At step 910 the cost based motion estimation at best partition level is performed to find the best search point among the eight half-pixel points and the one integer-pixel point.

According to a non limiting exemplary embodiment of the present invention, at step 912 motion vector of best search point result obtained for $n^{th}$ reference frame is assigned to a centre of the $n^{th}$ motion vector cmvn and the best search point may include but not limited to an integer-pixel point, half-pixel point and the like. Next at step 914 the method of finding the best search point enters into the eight quarter pixel point by calculating the cost factor for quarter-pixel motion estimation which is found from the set of motion vectors by using the best half-pixel motion estimation motion vector. The cost factor at step 914 is calculated by multiplying the lamda value with the subtraction of motion vector bits(mvi) and predicted motion vector bits(mvp), where i value ranges from 0 to 7. Further at step 916 the quarter-pixel values around the centre motion vector are found by the results obtained from the half-pixel motion estimation using interpolation which is being processed at partition level.

In accordance with a non limiting exemplary embodiment of the present invention, at step 918 the cost based motion estimation at best partition level is performed to find the best search point among the eight quarter-pixel points and the one half-pixel point. Next at step 920 the best search point information which may include but not limited to a motion vector, rate distortion cost and the like is being obtained for the $n^{th}$ reference frame where the best search point may include but not limited to an integer-pixel, half-pixel, quart-pixel and the like. Further at step 922 the reference frame number n value is increased to one and checked by providing a condition at step 924 that whether the increased value of reference frame number is less than the number of reference frames or not. If the reference frame number is found to be less than the number of reference frames then the method continues with step 904 and if the reference frame number is found to be greater than or equal to the number of reference frames the method continues with the step 926.

According to a non limiting exemplary embodiment of the present invention, at step 926 the method of frame is being verified that whether the frame is bidirectional predictive frame or not. If the identified frame is not found to be bidirectional predictive frame the method continues with step 928 and if the identified frame is found to be the bidirectional predictive frame the method continues with the step 944. At step 928 further there is a condition being provided to determine that whether the best partitions obtained from multiple reference frames in case of a predictive frame are same or not. If the best partitions obtained from multiple reference frames in case of a predictive frame are found to be same then the method continues with the step 930 to find the reference index of each partition in a macro block separately by considering the rate-distortion cost and reference index weight factor and further the entire macro blocks rate distortion cost value is being found at step 932 and continues with the step 936.

In accordance with a non limiting exemplary embodiment of the present invention, if the best partitions obtained from multiple reference frames are in case of a predictive frame are not found to be same at step 928, then the method continues with the step 934 to find the reference index of multiple partitions of a macro block in a combined manner by considering the rate-distortion cost, reference index weight factor and partition mode weight factor and continues with the step 936. Next at step 936 the motion compensation of predictive skip motion vector is being calculated to find the rate distortion cost of predictive skip point at step 938. Further at step 940 the best motion vector among the motion vector results are obtained after deciding the reference frame and the predictive skip point and also further at step 942 the final motion information which may include but not limited to a motion vectors, set of reference indices and partition mode and the like of macro block are prepared.

According to a non limiting exemplary embodiment of the present invention, if the identified frame is found to be the bidirectional predictive frame at step 926 the method continues with the step 944 to determine that whether the best partitions obtained for multiple reference frames are found to be same or not. If the best partitions obtained for multiple reference frames from 0 . . . N−1 in case of a bidirectional predictive frame are found to be same, then the method continues with the step 946 to find the best forward reference index of the each partition in macro block separately by considering the rate distortion cost factor and reference index weight factor. Next at step 948 the bidirectional predictive motion compensation data is found by using the forward and backward motion compensation data for each partition and at step 950 the rate distortion cost of bidirectional prediction motion vector is calculated. Further at step 952 the best prediction direction of each partition is separately calculated and continues with the step 960.

In accordance with a non limiting exemplary embodiment of the present invention, if the best partitions obtained for multiple reference frames from 0 . . . N−1 in case of a bidirectional predictive frame at step 944 are not found to be same, then the method continues with the step 954 to find the best forward reference index of all partitions in a macro block in combined manned by considering the rate distortion cost factor, reference index weight factor and partition mode weight factor. Next at step 956 a condition is being evaluated to determine that whether the forward best partition is equal to the backward best partition or not. If the forward best partition is found to be equal to the backward best partition, then the method continues with the step 948 and if the forward best partition is found to be not equal to the backward best partition then the method continues with the step 958 where the maximum partition size among the forward best partition size and backward best partition size are assigned to the forward best partition and the backward best partition.

According to a non limiting exemplary embodiment of the present invention, after finding the best prediction direction of each partition at step 952 separately the method continues with the step 960 to find the entire macro blocks rate distortion cost value. Next at step 962 the motion compensation of bidirectional predictive skip motion vector is being calculated to find the rate distortion cost of bidirectional predictive skip point at step 964. Further at step 966 the best motion vector among the motion vector results are obtained after deciding the reference frame and the bidirectional predictive skip point and also further at step 968 the final motion information which may include but not limited to a motion vectors, set of reference indices and partition mode and the like of macro block are prepared.

While specific embodiments of the invention have been shown and described in detail to illustrate the inventive principles, it will be understood that the invention may be embodied otherwise without departing from such principles.

What is claimed is:

1. A method of performing motion estimation over multiple reference frames in a video processing system, the method comprising:
considering at least one motion vector of a plurality of neighbouring macro blocks present in a current frame and a co-located frame to find a best prediction point motion vector set, whereby a current macro block of the current frame and an at least one neighbouring macro block of the current frame are co-related with a co-located macro block of the co-located frame and at least one neighbouring macro block of the co-located frame;
scaling at least one motion vector in a plurality of prediction frames and a plurality of bidirectional predictive frames to find a predictive motion vector set by calculating a temporal distance between a $n^{th}$ reference frame and a reference frame referred by an input motion vector;
finding at least one best motion vector of the $n^{th}$ reference frame from a set of plurality of motion vectors by utilizing a cost based motion search comprising:
finding a prediction motion vector from at least one maximum partition level by utilizing a motion vector prediction procedure according to the video coding standards;
finding a cost factor of the at least one motion vector from a set of plurality of motion vectors to determine the best motion vector as the centre motion vector;
performing a cost based motion search of at least one partition level to find the best motion vector from the set of plurality of motion vectors; and
assigning a best motion vector obtained for the $n^{th}$ reference frame to a centre of motion vector of $n^{th}$ reference frame.

2. The method of claim 1, further comprises a step of scaling a motion vector from the plurality of prediction frames by calculating the temporal distance between the current frame and the $n^{th}$ reference frame and the temporal distance between the co-located frame and the reference frame referred by the at least one maximum partition level.

3. The method of claim 1, further comprises a step of scaling a motion vector from the plurality of bidirectional frames by calculating the motion estimation of an n−1 forward reference frames and one backward reference frame.

4. A method of performing an integer pixel based motion estimation over multiple reference frames in a video processing systems, the method comprising:
calculating a best motion vector in a search window around a centre motion vector for at least one reference frame by utilizing the integer pixel motion estimation search pattern comprising:
performing a coarse-grain motion estimation search in a first (M−1) steps at a maximum partition level among a plurality of partition levels for calculating a cost factor with a sum of absolute difference value to find a best motion vector as centre point for fine-grain motion estimation;
performing a fine-grain motion estimation search at a plurality of partition levels in final step by calculating a sum of absolute difference value to find the best motion vector for at least one partition separately and
finding the best partition mode for the nth reference frame by calculating a minimum rate distortion cost at the maximum partition level among the plurality of partition levels and a minimum rate distortion cost at the remaining partition levels among the plurality of partition levels.

5. The method of claim 4, further comprises a step of performing a cost based coarse-grain motion estimation at maximum partition level of a macro block to find the best search point from a plurality of search points.

6. The method of claim 4, further comprises a step of assigning a motion vector of a best search point resulted for the nth reference frame to a centre motion vector at the coarse-grain motion estimation step.

7. The method of claim 4, further comprises a step of performing a fine-grain motion estimation at a plurality of partition levels of a macro block to find the best search point from the plurality of search points for at least one partition separately.

8. A method of performing a fractional pixel based motion estimation algorithm over multiple reference frames in a video processing system, the method comprising:

calculating a cost based motion estimation at a best partition level to find a best search point from an eight half pixel points and one integer pixel point, whereby the best search point result obtained from the eight half pixel points and one integer pixel point are assigned to a centre motion vector;

calculating a cost based motion estimation at a best partition level to find the best search point from an eight quarter pixel points and one resulted in half pixel motion estimation, whereby the best search point result obtained from the eight quarter pixel points and one resulted in half pixel motion estimation includes a motion vector and a rate-distortion cost value of the nth reference frame;

performing a cost based half-pixel motion estimation and a quarter-pixel motion estimation in a plurality of frames to find the reference index of at least one partition in a macro block by considering at least one of: a rate distortion cost; and a reference index weight factor; and a partition mode weight factors;

finding a rate distortion cost of a plurality of prediction frame skip points and a plurality of bidirectional frame skip points by compensating a motion of plurality of motion vectors, whereby a plurality of prediction frame skip motion vectors and a plurality of bidirectional frame skip motion vectors are compared with the fractional pixel motion estimations motion vector to provide a plurality of prediction skip modes and a plurality of bidirectional skip modes of plurality of prediction frames and a plurality of bidirectional frames; and selecting a best motion vector from the plurality of motion vectors obtained after deciding the reference frame and a plurality of prediction skip motion vectors and a plurality of bidirectional skip motion vectors.

9. The method of claim 8, further comprises a step of finding a real prediction motion vector of at least one $0^{th}$ partition level at a $n^{th}$ reference frame in the fractional-pixel motion estimation search.

* * * * *